United States Patent [19]

Benedetto et al.

[11] 4,254,659
[45] Mar. 10, 1981

[54] FLUID DYNAMIC ANGULAR RATE SENSOR

[75] Inventors: Kenneth R. Benedetto, Medway; Larry J. Linder, Dayton, both of Ohio

[73] Assignee: KBG Corporation, Medway, Ohio

[21] Appl. No.: 3,490

[22] Filed: Jan. 12, 1979

[51] Int. Cl.$^3$ .............................................. G01P 15/00
[52] U.S. Cl. .................................. 73/516 LM; 73/204
[58] Field of Search ................... 73/204, 505, 516 LM

[56] References Cited

U.S. PATENT DOCUMENTS

| | | | |
|---|---|---|---|
| 3,500,690 | 3/1970 | Schuemann | 73/516 LM |
| 3,500,691 | 3/1970 | Moore | 73/516 LM |
| 3,548,637 | 12/1970 | Wicks | 73/204 X |
| 4,020,699 | 5/1977 | Schaffer | 73/516 LM X |

*Primary Examiner*—Charles A. Ruehl
*Attorney, Agent, or Firm*—Becker & Becker, Inc.

[57] ABSTRACT

An angular rate of change sensing device of the type wherein angular rate of change, movement, or velocity is indicated by sensing a differential fluid velocity relative to a sensing apparatus in an underdeveloped laminar fluid flow field and is characterized primarily in that under conditions of no angular movement, there exists a constant or flat fluid velocity and density profile in a plane normal to the longitudinal axis of the flow channel. The device consists of a fluid flow inlet conditioner, a contoured inlet nozzle, a straight or slightly diffusing flow channel, a flow sensing apparatus inside the channel, and a device for pumping fluid through the flow conditioner and channel. Under conditions of angular rotation the velocity profile of a constant velocity, laminar fluid flow field relative to a sensing apparatus, is distorted due to fluid dynamic inertial effects and due to the effects of a relative velocity differential between sensing elements. Sensing apparatus positioned inside the fluid flow channel responds to a differential fluid velocity and yields output signals proportional to an induced angular movement in a plane which includes the differential sensors and the longitudinal axis of the flow channel.

6 Claims, 10 Drawing Figures

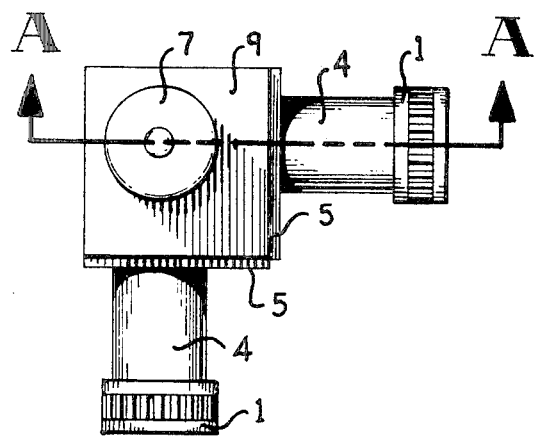
Fig.-5
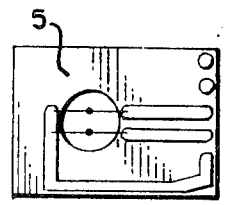
Fig.-7 AXIS ONE
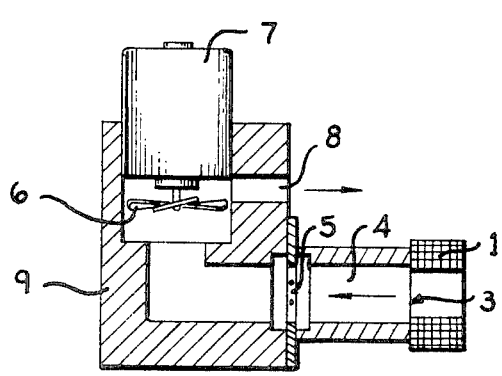
Fig.-6 SECTION A-A
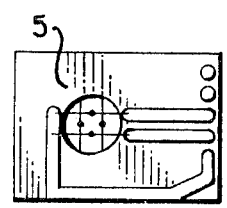
Fig.-8 AXIS TWO AND THREE

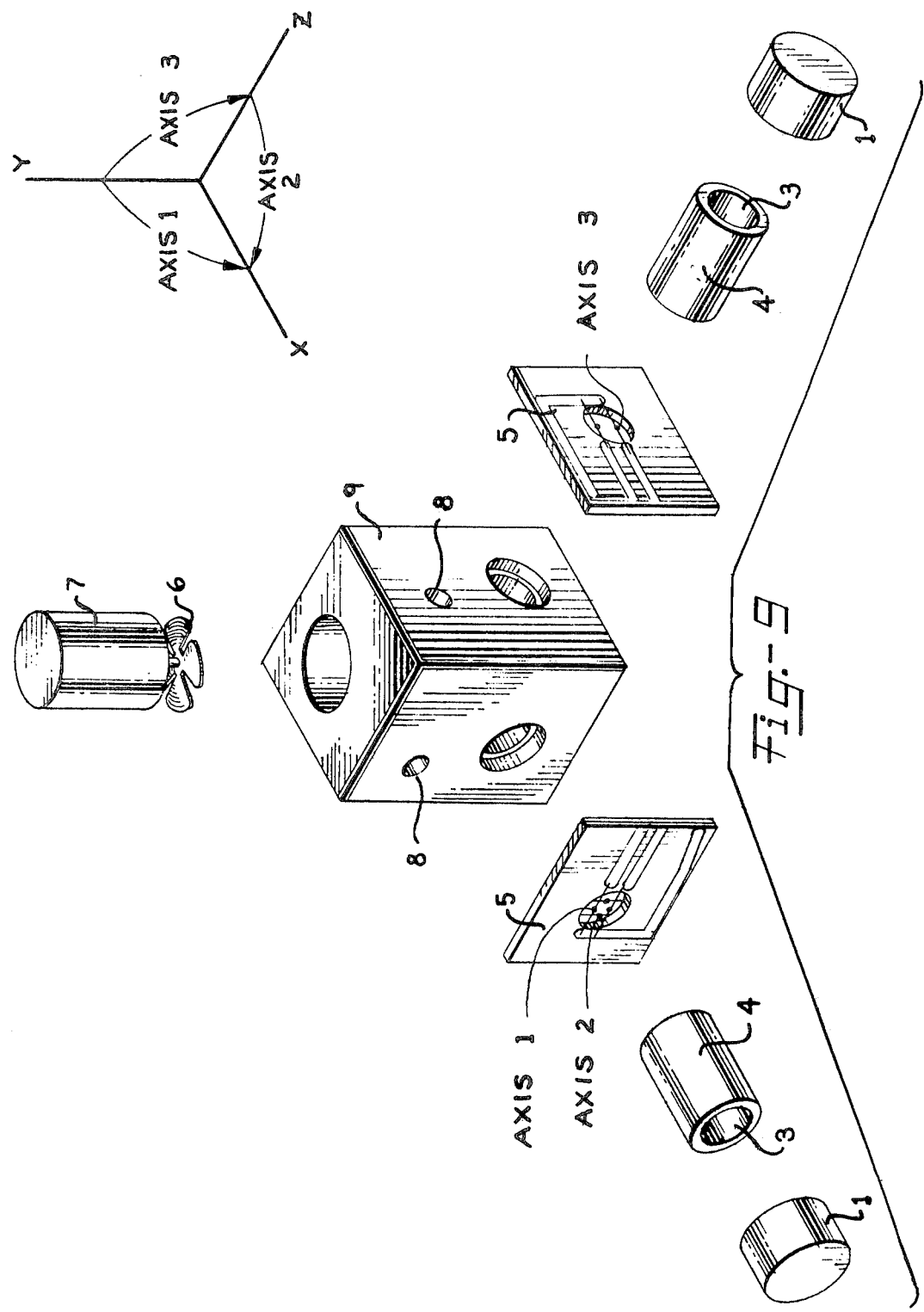

FLUID DYNAMIC ANGULAR RATE SENSOR

BACKGROUND OF THE INVENTION

1. Field of the Invention

This invention is related to angular velocity or rate sensors and more particularly to a novel technique based on the mechanics of fluid dynamic laminar flow.

2. Description of the Prior Art

A type of "fluidic" angular rate sensor known in the art is described by U.S. Pat. No. 3,500,691—Moore issued Mar. 17, 1970 according to which angular rate is sensed by the deflection of a laminar fluid jet which is discharged through a nozzle. The deflection of the jet stream is sensed downstream by thermistor elements which are positioned apart such that under conditions of no angular movement, the jet stream traverses between the sensing elements. A sleeve or shroud is incorporated around the jet nozzle and sensing means in order to reduce the effects of fluid shear or turbulent boundary layer which surrounds the discharging jet. The interaction of the discharging jet from its nozzle with the ambient fluid into which the jet proceeds results in a flow instability which interacts with the sensing means. In order to avoid a resultant noise signal from the sensing means, the sensing means are separated by a spacing which is larger than what could be considered the fluid jet diameter. This results in an angular rate "threshold" of sensitivity which is unacceptable for most sensitive applications. In addition, the jet nozzle must be precisely aligned with the downstream sensing means in order for the jet discharge to symmetrically affect the sensing elements. This feature adds to the difficulty of assembly and manufacture.

Other devices known to prior art are primarily electromechanical in nature, such as rate gyroscopes. Rate gyros involve high speed rotating parts which must be precisely manufactured and assembled, have relatively short lifetimes, require relatively long warm-up times and are relatively expensive.

SUMMARY OF THE INVENTION

The primary object of the present invention is to provide an angular rate or angular velocity sensing device which has no critical moving mechanical parts, very high sensitivity, improved linearity over a wider range of angular velocity, improved background noise characteristics, a very significantly reduced threshold sensitivity or response lag, fewer mechanical parts, significantly less critical alignment and assembly requirements and which is less costly to manufacture. Further objects of this invention include single axis sensitivity, reduced ambient temperature effect, immunity from being overranged or "tumbled", minimal sensitivity to linear or vibrational accelerations and a very long operational lifetime.

The above objects have been attained in accordance with this invention by the conception and implementation of a novel technique based on fluid dynamic principles of laminar fluid flow near the contoured inlet reqion of a flow channel. A feature of this invention is to provide a uniform field of laminar fluid flow in a flow channel which may be comprised of a contoured inlet nozzle, a smooth straight-walled or slightly diffusing pipe or channel, and a means of establishing the required flow through the channel. Inside the channel, positioned approximately 3 channel diameters downstream from the inlet nozzle, is a means of sensing a differential relative fluid flow. The fluid may be an inert gas such as helium, or may be carbon dioxide, air, or a vapor of suitable properties. The pumping means may be a simple fan driven by a small electric motor, or a pump of the piezo-electric type which is known in the prior art. The sensors, which may be small diameter thermistor beads or very fine tungsten or platinum wires, are positioned at an axial position approximately three channel diameters downstream from the channel inlet in a region of fluid flow where the fluid flow is considered to be, in terminology of fluid dynamics, "underdeveloped". This term signifies a fluid dynamic flow in a pipe or channel where the fluid properties, velocity, density, pressure, etc., are considered to be radially constant. This is in contrast to a fluid flow farther downstream, usually about 20 pipe diameters, where the flow characteristics develop into parabolic distributions across the diameter, which is termed to be "fully developed" flow. The sensors which consist of two thermally sensitive resistive elements are positioned symmetrically apart at the same axial position at a distance on the order of one third the channel diameter. The farther apart the elements are positioned, the more sensitive the device becomes until they are positioned outside the region of constant flow properties. If they are positioned too close to one another, sensitivity decreases and they will ultimately interact with each other, resulting in output noise. The recommended method of sensor operation in the case of using thermistor elements is to operate both sensors in a constant temperature mode. This is achieved by forcing the thermistor elements to operate at a selected resistance which is accomplished by a suitable external electrical circuit. Fluid flow is established in the channel by a pumping means such as an electric motor-driven fan. Fluid is pulled through the channel and exhausted or preferably recirculated. The absolute fluid flow velocities and mass flow rate are so low that they are extremely difficult to measure. The Reynold's Number of flow which is laminar under standard conditions is less than about 2000. An estimate of Reynold's Number based on the operation of this device at atmospheric pressure is about 20. This is based on a channel diameter of 0.400 inches with a flow of air as the fluid. With the proper flow of fluid established in the channel and sensor elements positioned and connected to a suitable external electrical circuit, under conditions of no angular movement, both sensors will encounter an identical heat transfer environment and their differential output signal will be zero. As the device is subjected to angular movement or velocity in a direction which is in the plane which includes the sensing elements and the longitudinal axis of the flow channel, essentially two effects combine to distort the fluid velocity profile, relative to the sensor elements, in proportion to the angular movement. One effect is that, since the sensor elements are separated apart along the radius of angular rotation, one sensor element is subjected to a greater linear velocity than the other element and due to the inherent inertial mass of the fluid, the elements encounter a difference in fluid velocity and resulting heat transfer. The second effect is due to the relative difference in linear velocity between the channel walls relative to fluid flow velocity. This results in an induced velocity profile being established across the channel diameter which is proportional to angular rotational velocity. This induced velocity profile is a result of the difference in viscous interaction or drag which is proportional to the difference between the fluid velocity at or near the wall with respect to the wall.

Second order effects occur under conditions of linear movement and accelerations result from the inertial mass of the fluid leading to density gradients across the fluid channel diameter. These effects are negligable and are not detectable by the sensor elements.

DESCRIPTION OF THE DRAWINGS

The preferred embodiments of this invention are hereinafter described with reference to the accompanying drawings in which:

FIG. 5, is a plan view of the three axis version of the angular rate sensor.

FIG. 6, is a cross sectional view taken along line A—A in FIG. 5 as a cut-away of structure in FIG. 5.

FIGS. 7 and 8 are plan views to illustrate the sensor mounting boards and sensors of the three axis device.

FIG. 9, is an exploded view that illustrates in a "blow-up" drawing the components of three axis device and the sensitive axis.

DESCRIPTION OF THE PREFERRED EMBODIMENTS

Figure 1:
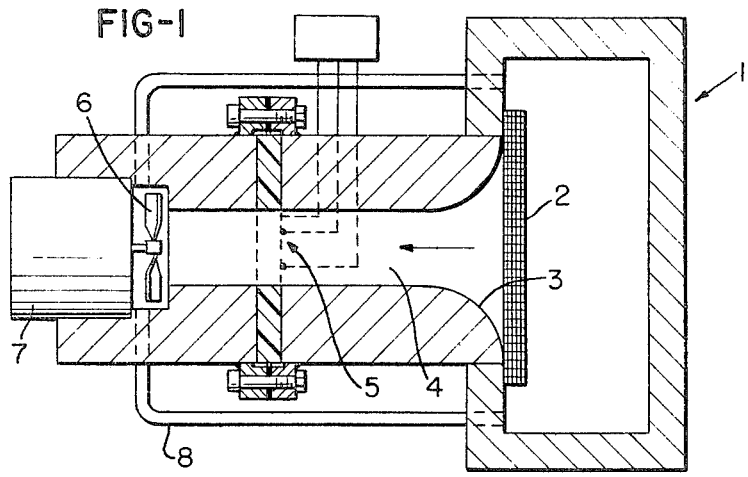
FIG. 1 is a cross-sectional illustration of the unit embodying the present invention.
Figure 3:
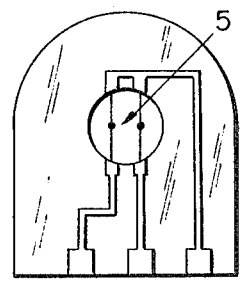
FIG. 3 is an illustration of a method of mounting the sensing elements.
Figure 2A:
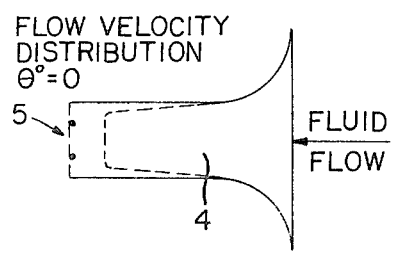
FIG. 2(a) is a graphical illustration of the fluid flow velocity profile under zero angular movement conditions.
Figure 2B:
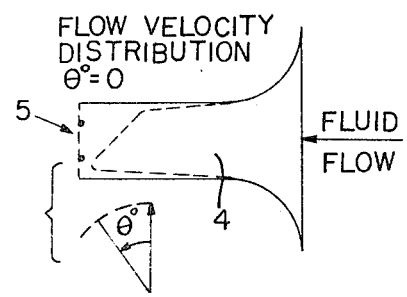
FIG. 2(b) is a graphical illustration of the fluid flow relative to the sensor elements under conditions of angular movement.
Figure 4:
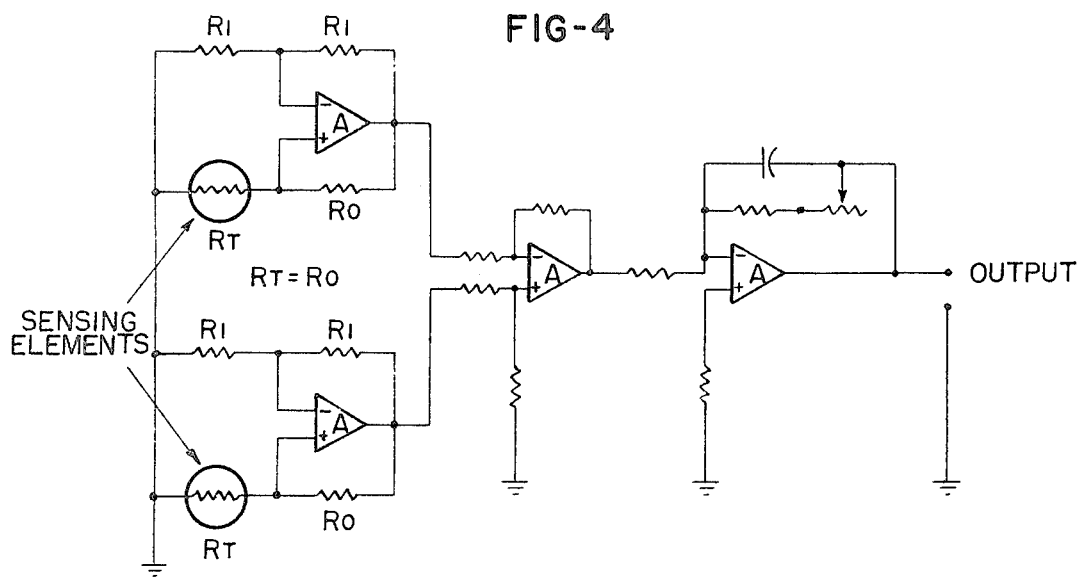
FIG. 4 is a schematic representation of an external electrical circuit for use with thermistor elements as the sensing means.

The sectional view of FIG. 1 is taken normal to the plane of angular sensitivity of the device. Referring to FIG. 1, a fluid dynamic angular rate sensor, according to the present invention, comprises the components illustrated and consists of an inlet plenum chamber portion 1 serving to dampen out inhomogenieties in fluid flow and providing a means to condition the fluid pressure distribution at the inlet region to the flow channel 4, a flow straightener 2 which further conditions the fluid flow characteristics to provide a uniform and constant field of flow density and velocity at the entrance to the flow channel which is comprised of a smoothly contoured nozzle 3. The flow straightener 2 is constructed of a fine-woven mesh screen material such as steel wool or "scotchbrite". The fluid channel 4 is a smooth, straight or slightly divergent-walled channel of circular or rectangular cross section. The dimensions of the channel cross section are not critical in themselves. Approximately three channel diameters downstream from the contoured nozzle inlet 3, there are located the sensing elements and mounting hardware 5. Referring to FIG. 3, a method of mounting the sensing elements is illustrated. Referring back to FIG. 1, a means of establishing a fluid flow in the channel 4 is illustrated. A fan or propeller blade 6 is driven by an electric motor 7 in such a manner as to pull fluid through the channel and exhaust or recirculate the fluid through the return line 8. Other means of pumping the fluid may be incorporated without changing the intent of this invention. With the above embodiments, FIG. 2a illustrates a fluid flow velocity profile under conditions of zero angular rate. FIG. 2b illustrates the fluid flow velocity profile when the unit is subject to angular rate in the plane described. When the direction of angular rotation is reversed, the flow velocity profile is changed with respect to the sensing elements accordingly. FIG. 4 is a schematic representation of an external electrical circuit which may be incorporated in order to provide the correct power to the thermistor sensing elements. As previously stated, the thermistor elements are operated at a constant temperature, however, they may also be operated in a constant voltage, current, or power mode. A thermistor generally consists of a small bead of semiconducting material placed between two wire leads. It is used for microwave power measurement, temperature measurement, and as a protective device. The type of electrical circuit shown incorporates the thermistor elements in a feedback circuit which, because of the thermistor's negative temperature-resistance characteristic, forces the thermistor elements to operate at a resistance specified by the value of resistor Ro in the electrical circuit.

Since both thermistor elements operate at the same temperature as determined by the resistors Ro in the electrical circuit, at zero angular rate, they will require the same voltage or power to maintain that temperature and the amplified differential output will be zero. In the case of a non-zero angular rate in the plane described, the flow assumes a velocity profile as described in heat transfer between the elements which is manifest in an increase and decrease respectively in voltage required to maintain the thermistor's constant temperature. This voltage differential is sensed and amplified by the external circuit resulting in an output voltage which is proportional to the magnitude and direction of angular rotation.

While the device herein disclosed is designed for single axis sensitivity, it is apparent that it could also be made sensitive to movement in a second plane normal to the first plant of sensitivity, and by constructing two orthogonal fluid flow channels, can be made sensitive to three orthogonl planes of rotation.

A second and/or third axis of sensitivity is achieved by incorporating an additional pair of sensors in the flow channel, mounted with their axis of sensitivity perpendicular to the first pair of sensors and by including an additional flow channel and pair of sensors with its direction of flow perpendicular to the direction of flow of the first flow channel. A three axis device incorporating the features of this disclosure is illustrated in FIGS. 5 through 9. In FIGS. 5 through 9, the inlet plenum chamber (1) consists of a paper filter which serves adequately to dampen flow inhomogenieties in the fluid flow entering the flow channel (4) and a mounting block (9) which provides a base for mounting the orthogonal flow channels (4) and sensing means and sensor mounting board (5). In this representation the fluid return line (8) is simply a port in the mounting block (9) which permits the flow to exhaust into the ambient environment.

The pairs of sensing elements corresponding to each of the sensitive axis of rotation requires its own independent electrical circuitry corresponding to that axis.

The device so illustrated and described is sensitive in three orthogonal axes of rotation.

As the device is subjected to angular movement or velocity in a direction which is in a plane which includes the sensing elements and the longitudinal axis of the flow channel the fluid velocity relative to the sensing elements changes in proportion to angular movement. Since, the sensor elements are physically separated or apart along the radius of angular movement, one sensor element is subjected to a greater linear velocity than the other element and due to the inherent inertial mass of the fluid, the elements encounter a relative difference in fluid velocity and resulting heat transfer.

The second effect due to relative difference in fluid velocity has been determined to be a very minor effect and perhaps should not be included or considered as a major feature of the operation of the device. The sensitive elements can be operated in a "constant current" mode as well as "constant temperature" mode, the difference being more stable and better response in "constant temperature" mode. The electrical circuit for "constant current" mode is different from the constant temperature circuit.

This device also works well with the "hot wire" or "constant current" wires used in anemometry. The specifying of "thermistor elements" should not be considered restrictive. Thermistors or fine wires are operated in essentially the same way except instead of having a negative temperature coefficient they have a positive temperature coefficient. The electrical circuit is changed correspondingly.

It is, of course, to be understood that the present invention is, by no means, limited to the specific showing in the drawings but also comprises any modifications within the scope of the appended claims.

What is claimed is as follows:

1. A unit for sensing the direction and rate of angular movement of a body comprising: a fluid flow channel including a short section of pipe, a flow inlet plenum connected longitudinally to one end of the flow-channel and providing a means for dampening out inhomogenieties and disturbances in pressure of the fluid flow which enters the inlet region of said fluid flow channel, a fluid flow-sensing means which respond to differences in fluid flow velocity across a diameter of said flow channel and are mounted to a fixture which is connected longitudinally to the end of said flow channel opposite said inlet plenum and with said sensing means positioned symmetrically about the longitudinal axis of said flow channel, a mounting block fixture to which parts including said inlet plenum, flow channel, and sensing means are attached and providing a base mounting for a fluid pumping means which is incorporated for the purpose of establishing a low velocity, uniform, laminar flow of fluid nearly across the entire diameter of said flow channel in a velocity direction into said inlet plenum, longitudinally through said flow channel, and exhausting into the ambient environment and alternately returned through pipes to said inlet plenum through ports in said mounting block fixture such that under conditions of angular movement in a plane which includes a diameter of said flow channel which passes centrally through the sensing means and the longitudinal axis of said flow channel, the distribution of fluid flow rate across said flow channel diameter becomes unsymmetrical proportional to the applied angular movement and the said sensing means respond proportionally to the said induced unsymmetric flow about the same channel diameter, the sensing means thus producing measurable output signals proportional to rate and direction of angular movement.

2. A unit according to claim 1 in which said inlet plenum is a cavity with porous side walls which provide sufficient fluid flow restriction in order to dampen out fluid pressure fluctuations as the inlet of said flow channel and provide a constant fluid pressure distribution across the entire diameter of said flow channel inlet region.

3. A unit according to claim 1 in which said fluid pumping means provides a constant, uniform, laminar flow of fluid through said flow-channel, the distribution of fluid flow rate and velocity across said flow channel diameter being nearly constant along the longitudinal axis of said flow channel under conditions of zero angular movement, the direction of fluid flow being toward said fluid pumping means.

4. A unit according to claim 1 in which said sensing means includes two thermally sensitive elements positioned at identical longitudinal distance from said flow-channel inlet region and being spaced apart from each other equal distances from the longitudinal central axis of said flow channel, said sensing means being responsive to induced differential in fluid flow velocity across a diameter of said flow channel and the longitudinal axis of the said flow channel.

5. A unit according to claim 4 in which said thermally sensitive elements are each electrically heated through independent external electrical circuits to an equilibrium temperature and whereby the direction and rate of angular movement is indicated by the differential in power required for maintaining said thermally sensitive elements at a constant equilibrium temperature because of the differential in heat transfer from said elements as a result of an induced unsymmetric fluid flow velocity distribution across the diameter of the said flow channel.

6. A unit according to claim 1 in which said section of pipe includes a smooth wall configuration having a length to internal pipe-cross-section diameter ratio of approximately three.

* * * * *